(12) United States Patent
Chen et al.

(10) Patent No.: US 11,633,784 B2
(45) Date of Patent: Apr. 25, 2023

(54) METAL-CERAMIC COMPOSITE POWDERS

(71) Applicant: The Curators of the University of Missouri, Columbia, MO (US)

(72) Inventors: Lianyi Chen, Rolla, MO (US); Minglei Qu, Rolla, MO (US)

(73) Assignee: THE CURATORS OF THE UNIVERSITY OF MISSOURI, Columbia, MO (US)

(*) Notice: Subject to any disclaimer, the term of this patent is extended or adjusted under 35 U.S.C. 154(b) by 201 days.

(21) Appl. No.: 16/901,879

(22) Filed: Jun. 15, 2020

(65) Prior Publication Data

US 2020/0391294 A1  Dec. 17, 2020

Related U.S. Application Data

(60) Provisional application No. 62/861,105, filed on Jun. 13, 2019.

(51) Int. Cl.
*B22F 9/04* (2006.01)
*B22F 1/065* (2022.01)
*B82Y 30/00* (2011.01)
*B82Y 40/00* (2011.01)

(52) U.S. Cl.
CPC ............... *B22F 9/04* (2013.01); *B22F 1/065* (2022.01); *B22F 2009/043* (2013.01); *B22F 2202/13* (2013.01); *B22F 2301/052* (2013.01); *B22F 2302/05* (2013.01); *B22F 2302/10* (2013.01); *B22F 2302/20* (2013.01); *B22F 2304/054* (2013.01); *B82Y 30/00* (2013.01); *B82Y 40/00* (2013.01)

(58) Field of Classification Search
None
See application file for complete search history.

(56) References Cited

U.S. PATENT DOCUMENTS 7,217,311 B2  5/2007  Hong et al.
9,023,128 B2  5/2015  Li et al.
9,738,788 B1  8/2017  Gross et al.
(Continued)

FOREIGN PATENT DOCUMENTS

CN    107252894 A  * 10/2017
RU    2492256 C1  *  9/2013

OTHER PUBLICATIONS

English Translation of RU 2492256 C1 (originally published Sep. 10, 2013) from PE2E search.*
(Continued)

*Primary Examiner* — George Wyszomierski
(74) *Attorney, Agent, or Firm* — Stinson LLP

(57) ABSTRACT

A process for manufacturing metal-ceramic composite material powder comprising ball milling metal powder and ceramic nanoparticles to yield a metal-ceramic composite powder comprising ceramic nanoparticles embedded in a metal matrix powder particles; wherein the ball milling is performed using a ceramic milling media and a milling vessel having a ceramic interior surface. Metal matrix nanocomposite powders comprising ceramic nanoparticles imbedded in metal matrix powder particles; wherein the metal matrix powder particles have a spherical shape; wherein there is uniform distribution the ceramic nanoparticles; wherein the nanocomposite powders have good flowability.

19 Claims, 4 Drawing Sheets

(56) References Cited

U.S. PATENT DOCUMENTS

| | | | |
|---|---|---|---|
| 10,787,728 B2 | 9/2020 | Martin et al. | |
| 2010/0124514 A1* | 5/2010 | Chelluri | B22F 9/04 419/33 |
| 2016/0101468 A1* | 4/2016 | An | B22F 1/102 75/229 |
| 2018/0214944 A1 | 8/2018 | Martin et al. | |
| 2019/0185974 A1* | 6/2019 | Yan | C22C 32/0036 |
| 2019/0194481 A1* | 6/2019 | Iacob | C09D 11/102 |

OTHER PUBLICATIONS

English translation of CN 107252894 A (originally published Oct. 17, 2017) from PE2E search.*

Almangour, B., et al., "In situ Formation of TiC-Particle-Reinforced Stainless Steel Matrix Nanocomposites During Ball Milling: Feedstock Powder Preparation for Selective Laser Melting at Various Energy Densities," 2018, Powder Technology, 326:467-478, Abstract only, 1 page.

Attar, H., et al., "Nonoindentation and Wear Properties of Ti and Ti-TiB Composite Materials Produced by Selective Laser Melting," 2017, Mat Sci Eng A, 688:20-26.

Gu, D., et al., "In-situ TiC Particle Reinforced Ti—Al Matrix Composites: Powder Preparation by Mechanical Alloying and Selective Laser Melting Behavior," 2009, Applied Surface Science, 255:9230-9240, 11 pages.

Han, Q., et al., "Synthesis and Characterisation of Advanced Ball-Milled Al13 Al2O3 Nanocomposites for Selective Laser Melting," 2016, Powder Technology, 297:183-192, 30 pages.

Martin, John H., et al. "3D printing of high-strength aluminium alloys" Nature 549.7672 (2017): 365.

* cited by examiner

METAL-CERAMIC COMPOSITE POWDERS

REFERENCE TO RELATED APPLICATIONS

This application claims priority to U.S. provisional application 62/861,105 filed Jun. 13, 2019.

GOVERNMENT LICENSE RIGHTS

This invention was made with government support under 1562543 awarded by the National Science Foundation and under DE-NA0002839 awarded by the Department of Energy. The government has certain rights in the invention.

FIELD OF THE INVENTION

The invention relates to composite powders of ceramic nanoparticles embedded in a metal matrix.

BACKGROUND OF THE INVENTION

Powder-based additive manufacturing (AM), or three-dimensional (3D) printing, is an advantageous approach to manufacturing components in many industries, including the aerospace and automotive industries. Preparation of suitable powders is necessary for the powder-based AM processes. The challenge to preparing metal matrix nanocomposite powders for AM processes is maintaining flowability and preventing nanoparticle agglomeration simultaneously.

Powders in which the particles comprise ceramic particles embedded in a metal matrix have been prepared by low-energy mixing and high-energy ball milling. Low energy mixing is known for its feasibility of mixing two similarly micro-sized particles. However, it is limited for ceramic nanoparticle dispersion because nanoparticles are easily aggregated when driven by strong van der Waals force.

High energy ball milling is capable of breaking agglomerated nanoparticles and uniformly dispersing nanoparticles into the metal matrix. However, ball milling usually introduces severe plastic deformation in metallic powders; thus they tend to be irregular in the shape, and therefore having poor flowability. Poor flowability adversely affects handling of powders during AM processes.

Another method of pre-alloying plus gas-atomization has also been proposed. However, the ceramic nanoparticles were found to agglomerate in the composite powder along grain boundaries, cell boundaries or dendrite boundaries due to chemical segregation during cooling or particle pushing by the solidification front.

Agent-aid deposition has been utilized and proposed to have the ability to separate nanoparticles. However, the deposition can only deposit nanoparticles on the surface of the metal powders. Moreover, the contamination introduced from the agent is severe during the process.

The industry needs a reliable process which can produce high quality metal matrix nanocomposite powders which have a spherical shape, good flowability, controllable particle size, clean powder surface, and uniform distribution of nanoparticles inside the powder for AM and other applications.

SUMMARY OF THE INVENTION

Briefly, therefore, the invention is directed a process for manufacturing metal-ceramic composite material powder comprising ball milling metal powder and ceramic nanoparticles to yield a composite powder comprising ceramic nanoparticles embedded in a metal matrix powder particles, wherein the ball milling is performed using a ceramic milling media and a ceramic milling vessel.

The invention is also directed to metal matrix nanocomposite powders comprising ceramic nanoparticles imbedded in metal matrix powder particles; wherein the metal matrix powder particles have a spherical shape; wherein there is uniform distribution of the ceramic nanoparticles; wherein the nanocomposite powders have good flowability.

Other objects and features will be in part apparent and in part pointed out hereinafter.

DETAILED DESCRIPTION OF PREFERRED EMBODIMENTS

Figure 1A:
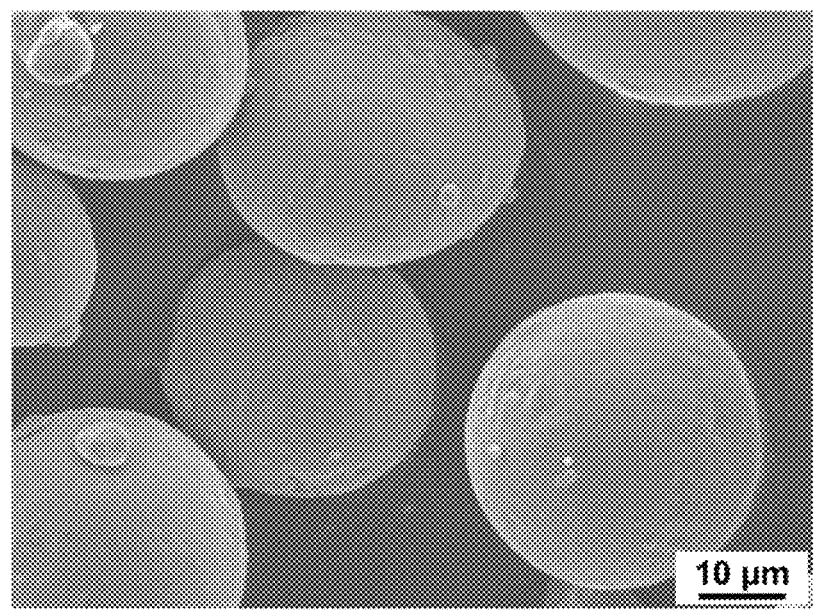
FIG. 1(a) is a scanning electron microscopy (SEM) image of gas atomized Al6061 powders.

The powder of the invention comprises a majority phase of continuous metal matrix comprising one or more metals selected from the group consisting of aluminum, iron, titanium, copper, magnesium, zinc, chromium, nickel, manganese, silicon, and silver, as well as alloys of such metals. The secondary phase is ceramic nanoparticles comprising one or more elements selected from the group consisting of, for example, titanium, zirconium, niobium, and combinations thereof as one or more of oxides, nitrides, hydrides, carbides, or borides. The secondary phase is uniformly distributed inside the base metal powder. The nanoparticles of the secondary phase have an average diameter of no greater than around 100 nm. The nanoparticles are present at a concentration ranging from 0.1% to 20%.

The starting materials for the method of the invention are metal powders and ceramic nanoparticles. The method of making the metal-ceramic composite powders of the invention comprises dispersing secondary ceramic nanoparticles inside metal powders by dry ball milling as described herein. Then the ball-milled metal matrix nanocomposite powders are collected and preferably subjected to a plasma spheroidization process, generating spheroidized metal matrix nanocomposite powders.

The process of the invention employs ceramic milling media which have a chemical composition which is carefully selected in comparison to the ceramic nanoparticles, as discussed further below. For example, in one embodiment, the ceramic milling media have the same as the chemical composition of ceramic nanoparticles. The ceramic milling media are spherical and have a particle size which is between about 50000 and about 500000 times the particle size of the ceramic nanoparticles, such as between about 100000 and about 400000 times the size of the nanoparticles, or between about 100000 and about 300000 times the size of the nanoparticles. As a general proposition, the ceramic nanoparticles have a particle size of between about 10 and about 100 nm, such as between about 10 and about 50 nm. The ceramic milling media have a particle size of between about 1 and about 10 mm, such as between about 3 and about 7 mm.

The starting metal powder has a particle size between about 10 and about 100 μm, such as between about 10 and about 50 μm.

By stating that the milling media, ceramic nanoparticles, and metal powder have a particular particle size range, this describes that the diameter of media, particles, or powders falls within this range, or other largest dimension when the components are not spherical. Moreover, this describes that the majority of the overall media, particles, or powder meet this size requirement, such as more that 60%, 70%, 80%, or more. That is, this does not exclude the presence of media, particles, or powder falling outside the stated range. So, for example, where the ceramic nanoparticles are described as having a particle size between 10 and 100 nm, this means that the majority of the nanoparticles have a diameter or other largest dimension that meets this requirement, and does not exclude the presences of some quantity of nanoparticles having a greater or smaller diameter.

As a general proposition, the main operation in the method for making metal-ceramic composite powders of the invention is to combine metal powder and ceramic nanoparticles in a vessel such as a jar which is made of the same ceramic material as the ceramic nanoparticles, and to ball mill the powder and nanoparticles using milling media which is made of the same material as the ceramic nanoparticles. In one variation, the milling vessel may be made of a material other than the ceramic material of the nanoparticles, provided it has a liner made of the same material as the nanoparticles. It is important that the interior surface of the milling vessel is made of the same material as the ceramic nanoparticles.

In the context of this description, the metal powders include powders that are entirely one metal; powders that are a mixture of two or more distinct powders, such as iron powders and copper powders; powders that are metal alloy powders; and combinations thereof. The powders include powders comprising one or more metals selected from the group consisting of aluminum, iron, titanium, copper, magnesium, zinc, chromium, nickel, manganese, silicon, and silver, as well as alloys of one or more of these.

The ceramic nanoparticles contain one or more elements selected from the group consisting of titanium, zirconium, niobium, and combinations thereof. Alternatively, the ceramic nanoparticles contain silicon as the metallic element. They are in the form of oxides, nitrides, hydrides, carbides, or borides. Among the various embodiments within the scope of these combinations of materials, therefore, are TiC nanoparticles in an aluminum alloy matrix (e.g., Al6061); $ZrO_2$ in steel (e.g., 17-4PH, 304, 316 L); $TiB_2$ in aluminum alloys (e.g., Al6061, Al7075); SiC in magnesium alloys (e.g., AZ91, AZ31); and TiCN in titanium alloys (e.g., Ti6Al4V).

To achieve a uniform dispersion of ceramic particles inside the powder, the invention uses a high energy input during ball milling process. Higher rotations per minute (RPM) corresponds to higher energy input. Using a metallic milling vessel and metallic grinding media can result in significant cold welding and fracture can happen on the surface of both grinding balls and metal powders when high energy is utilized when the metal powders and grinding media are the same or similar materials and have similar hardnesses. As the process progresses, the mass of the metal powders is no longer consistent due to the mass transfer between the metal powders and grinding media. Changes in grinding ball shape can make the process unstable, which can result in a large variation of the composition and size for the final ball milled powders.

To avoid these disadvantages, in the present invention, a ceramic grinding vessel (e.g., vial) and balls or other media are used during the ball milling process. The grinding vessel and media in one embodiment are made of the same material as the ceramic nanoparticle. The process is therefore a ceramic same material jar dry ball milling process. Since the ceramic grinding media is harder than the metal powders, only the metal powders undergo deformation, cold welding, and fracture during the collision between metal powders and grinding media. By this method, mass transfer and contamination of metal powders from grinding balls is minimized or eliminated. Moreover, minor mass exchange between the powders and grinding balls does not bring about any contamination since the grinding balls are made of same material as the ceramic nanoparticles. And since the shape of the grinding balls remains consistent—since the grinding media are harder than the metal powders and are at least as hard as all other materials in the milling environment—the ball milling process is very stable, resulting in a relatively uniform size and composition for the final powders. Furthermore, the service life of ceramic jars is much longer compared to metallic jars due to the more durable characteristics, and there is less depletion during the ball milling process). Dry mill milling is able to be performed without any process control agent (PCA), which further reduces risks of contamination.

Alternatively to having the entire milling made of the selected ceramic material, an alternative to various embodiments herein is that the interior surface of the milling vessel is made of the selected ceramic material. This can be achieved by coating a layer of nanoparticles on the inner wall of a metal milling vessel.

In an alternative embodiment, the ceramic milling media and/or milling vessel interior surface are not strictly the same composition as the composition of the ceramic nanoparticles, but the media and/or vessel interior surface have a ceramic chemical composition with a hardness which is the same as or greater than the hardness of the ceramic nanoparticles.

In still another embodiment, the ceramic milling media and/or milling vessel interior surface are made from a ceramic material which has the same metallic element as the ceramic nanoparticle material. For example, an oxide of Ti, Zr, or Nb is used for the milling media and/or vessel interior surface, and a nitride, hydride, carbide, or boride of the same element (Ti, Zr, or Nb) is used for the nanoparticles. That is, the nanoparticles comprise an oxide, nitrides, hydrides, carbides, or borides of Ti, Zr, or Nb; and the milling media and/or milling vessel interior surface comprises the same metallic element selected from among Ti, Zr, and Nb, and a secondary element which is L, N, H, C, or B but not the same secondary element as the compound of the nanoparticle. For example, TiC for the nanoparticles and $TiO_2$ for the milling media.

In a further embodiment where contamination of the nanoparticles is less of a concern, the ceramic milling media and/or milling vessel interior surface comprise a ceramic material which has the different metallic element selected from among Ti, Zr, and Nb from the Ti, Zr, or Nb metallic element of the ceramic nanoparticle material. For example, the ceramic nanoparticles comprise a Ti-based ceramic material and the milling media and/or vessel interior surface comprise a Zr- and/or Nb-based ceramic material. This is suitable, for example, for certain applications using TiC+ metal matrix composite particles in which minor contamination by Zr and/or Nb are not a concern.

The ultimate particle size can be controlled to meet the requirements of the additive manufacturing or other process in which the composite particles will be used. For example, the average particle size can be from 5 µm to 200 µm. Different additive manufacturing technologies use particles with different sizes. For example, powder bed fusion normally uses 20-50 µm powders. Directed energy deposition uses 50-150 µm powders. The powders can be made to fit different applications by tuning the ball milling parameters, e.g., milling time, rpm.

After the ball milling process, the grinding vessels are opened and the nanocomposite powder collected in an appropriately clean environment. For example, the vessels are opened inside a glove box with an argon atmosphere and an oxygen and water content below one ppm. The nanocomposite powders are separated from the grinding balls by utilizing a sieve with the mesh size falling between the size of powders and grinding balls. Afterwards, the ball milled nanocomposite powders are preferably maintained in this environment (e.g., kept inside the glove box) for another 24 hours.

To achieve a spherical shape and keep improving the quality (surface cleanliness, powder density) of the powder, plasma spheroidization is optionally employed to process the ball milled nanocomposite powders to generate spheroidized metal matrix nanocomposite powders. In particular, the composite powders are optionally passed through a hot plasma gas in which the metal matrix component is subject to some melting. As the droplets fall and cool, they solidify as spheres.

After spheroidization, the powders can be further processed by mixing with acetone in a beaker for ultrasonic cleaning. This removes vaporized nanoscale condensate from the spheroidized powders. After that, the acetone is poured out and the powders are dried in the oven, thus yielding spherical nanocomposite powders with uniform distribution of ceramic nanoparticles inside a metal powder matrix.

EXAMPLE

Nanocomposite powders of TiC ceramic particles in an aluminum alloy (Al 6061) metal matrix powder were manufactured according to the process of the invention. The starting material for the metal alloy powders used were gas atomized Al6061 powders (99.85% purity, average particle size of 34 µm, from Valimet, Inc.). The composition of the Al6061 powders was as follows:

| | Element | | | | | | | |
|---|---|---|---|---|---|---|---|---|
| | Al | Cr | Cu | Fe | Mg | Mn | Si | Ti | Zn |
| Wt % | Balance | 0.2 | 0.3 | 0.7 | 1 | 0.15 | 0.6 | 0.15 | 0.25 |

Figure 1B:
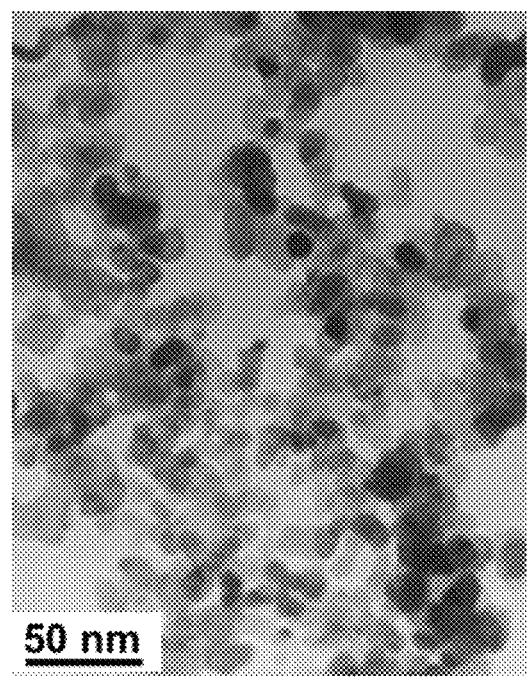
FIG. 1(b) is a transmission electron microscopy (TEM) image of TiC nanoparticles.

The starting material for the ceramic nanoparticles was TiC nanoparticles (99% purity, average particle size of around 40 nm, from Skyspring Nanomaterials, Inc.). FIG. 1(a) is a scanning electron microscopy (SEM) image of the gas atomized Al6061 powders, and FIG. 1(b) is a transmission electron microscopy (TEM) image of the TiC nanoparticles.

Ball milling was performed using TiC grinding jars having a capacity of 100 ml and TiC grinding balls with diameter of 5 mm. The milling jars were loaded with 20 g (Al6061-5 vol. % TiC) powders with a ball-to-powder weight ratio of 5:1. The rotation speed of the disc was set at 400 RPM and the milling time was 8 hours. There was a pause of 10 min after every 20 minutes. No process control agent was used. To prevent oxidation during the ball-milling process, the grinding jars were filled with argon gas, and a lock device was used to gas-tight seal the bowls in an argon filled glove box.

Figure 2A:
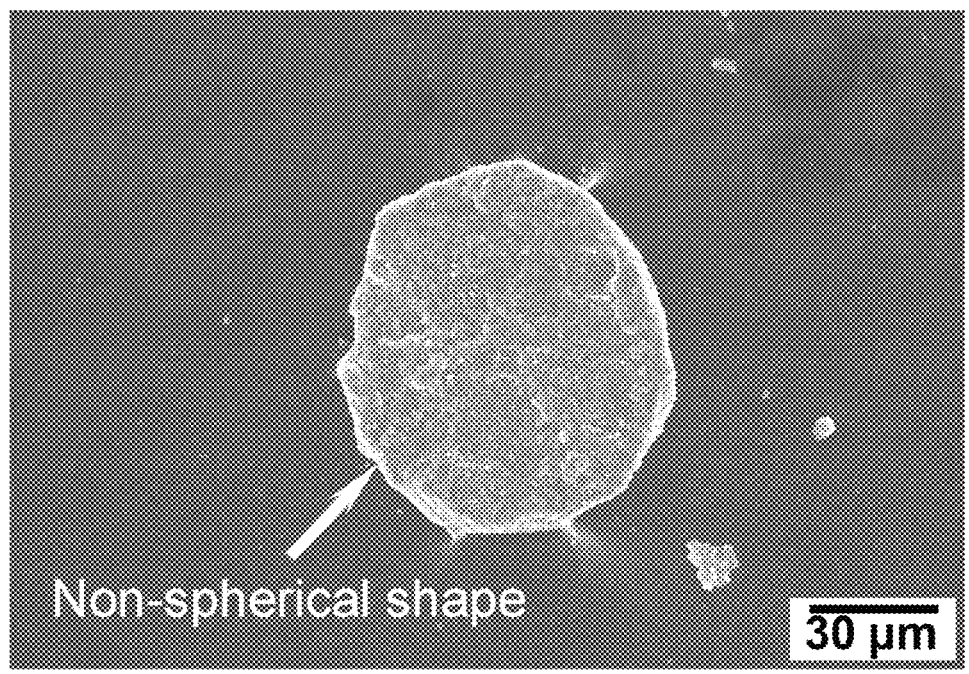
FIG. 2(a) is an SEM image of a nanocomposite particle.
Figure 2B:
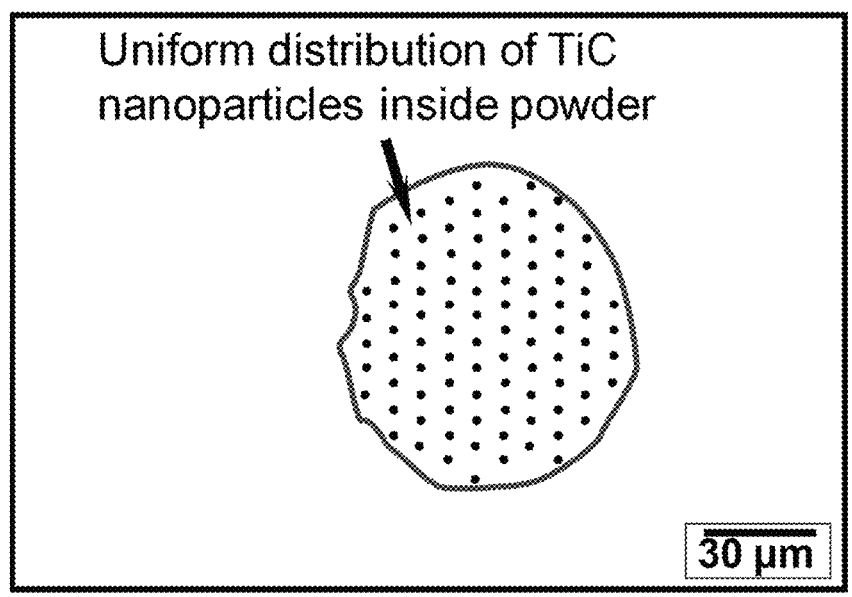
FIG. 2(b) is a schematic drawing of nanocomposite particle.

After the ball milling process, the jars were opened inside the glove box with an argon atmosphere and an oxygen and water content below one ppm. The nanocomposite powders were separated from the grinding balls by utilizing a sieve with the mesh size falling between the size of powders and grinding balls. Afterwards, the ball milled nanocomposite powders were kept inside the glove box for another 24 hours. FIG. 2 shows the characteristics of the resulting ball milled Al6061-5 vol. % TiC nanocomposite powder. As shown in FIG. 2(a), most ball milled Al6061-5 vol. % TiC nanocomposite powders show a non-spherical shape because severe fracture and cold-welding happen in the ball milling process. During the continuous fracture and cold-welding of the Al6061 powders, TiC nanoparticles are imbedded into the Al6061 matrix and uniform distribution of the TiC nanoparticles is obtained in the ball milled Al6061-5 vol. % TiC nanocomposite powder, as shown in FIG. 2 (b). The average size of the TiC nanoparticles represented by the dark spots is around 40 nm. The average size of the overall powder particles is on the order of 50 µm.

The Al6061-TiC nanocomposite powders were then subjected to spheroidization using a TekSphero 15 apparatus available from Tekna Plasma Systems Inc. (Canada). Spheroidization was performed under the following process parameters. The plasma torch power was 12 kW. An argon-hydrogen mixture was used as the plasma-forming gas. The flow rate of the argon shield gas was 40 liters per minute (LPM). The flow rate of the argon central gas was 40 LPM. The flow rate of the hydrogen gas was 10 LPM. The powder feed rate was 12 g/min.

After the spheroidization, the powders were mixed with acetone in a beaker and subjected to ultrasonic cleaning. This allowed removal of vaporized nanoscale condensate from the spheroidized powders. After that, the acetone was poured out and the powders were dried in the over at 100° C. for 24 hours.

Figure 3A:
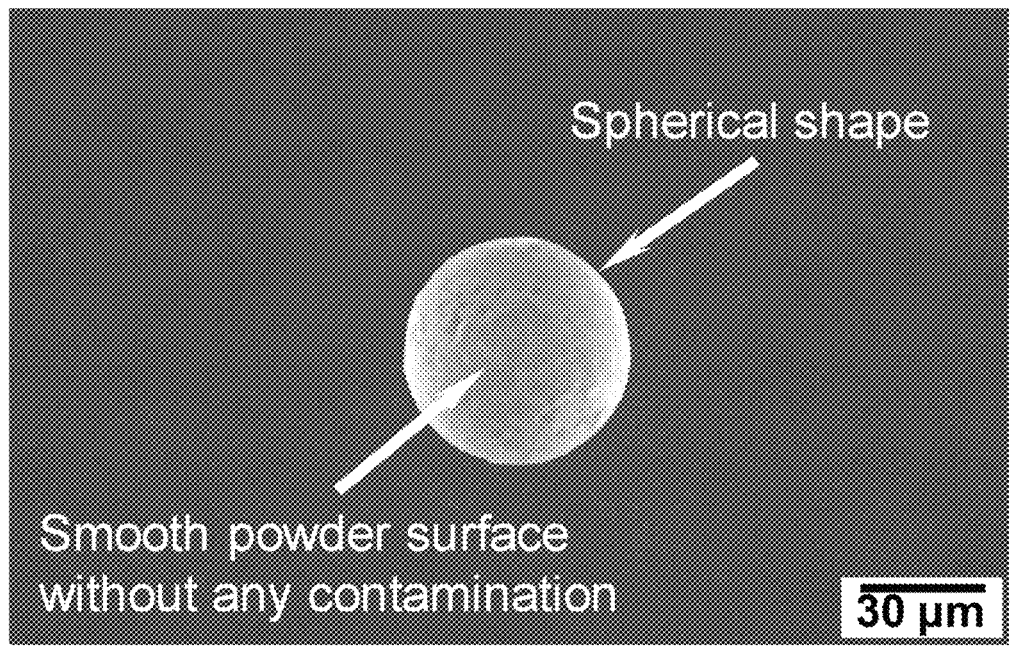
FIG. 3(a) is an SEM image of a nanocomposite particle after spheroidization.
Figure 3B:
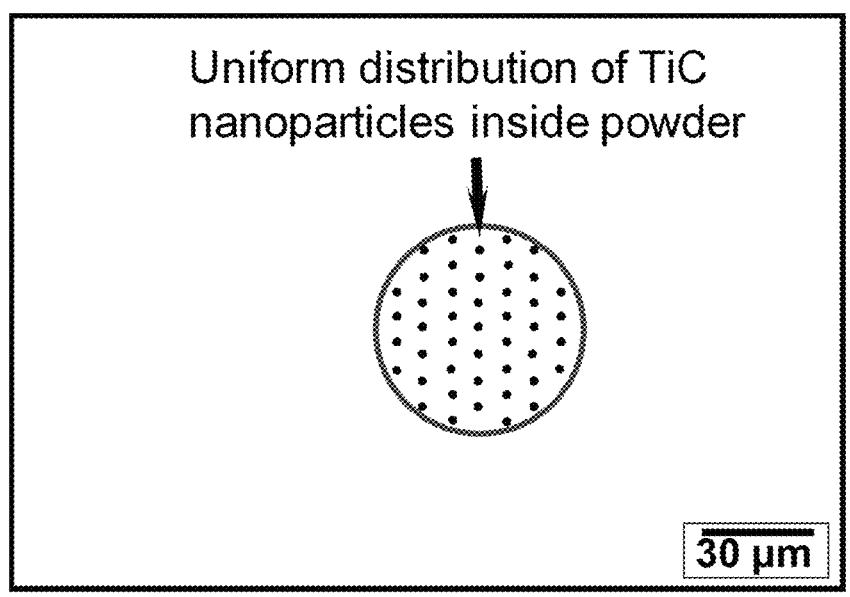
FIG. 3(b) is a schematic drawing of nanocomposite particle after spheroidization.

After the powders were fully dried, the spherical nanocomposite powders with uniform distribution of ceramic nanoparticles inside were obtained. FIG. 3 shows images of the final spheroidized Al6061-5 vol. % TiC nanocomposite powder. After plasma spheroidization, the morphology of the nanocomposite powder was spherical and the surface of the powder was smooth and clean without any contamination, as shown in FIG. 3(a). The TiC nanoparticles are uniform distributed inside the final Al6061-5 vol. % TiC nanocomposite powder, as shown in FIG. 3(b).

To study the processability of the powders during AM process, the Al6061-5 vol. % TiC nanocomposite powders were utilized as the feedstock powders for a selective laser melting (SLM) process to build an Al6061-5 vol. % TiC component. A laser system equipped with an ytterbium fiber laser (IPG YLR-500-AC, USA) was used. The fiber laser was in multi-mode, providing pure Gaussian beam profiles. The wavelength was 1070 nm and the maximum power was 500 W. The fiber laser was operated in continuous wave (CW) mode. The laser spot size was about 200 µm. The samples were located and built inside a chamber made of stainless steel and aluminum with argon protection atmosphere. For each layer, the layer thickness was 50 µm, while the hatch spacing was 80 µm. The horizontal area of the built part was 1 cm×1 cm. The laser power was 350 W, while the scan speed was 0.2 m/s for the SLM process.

Figure 4:
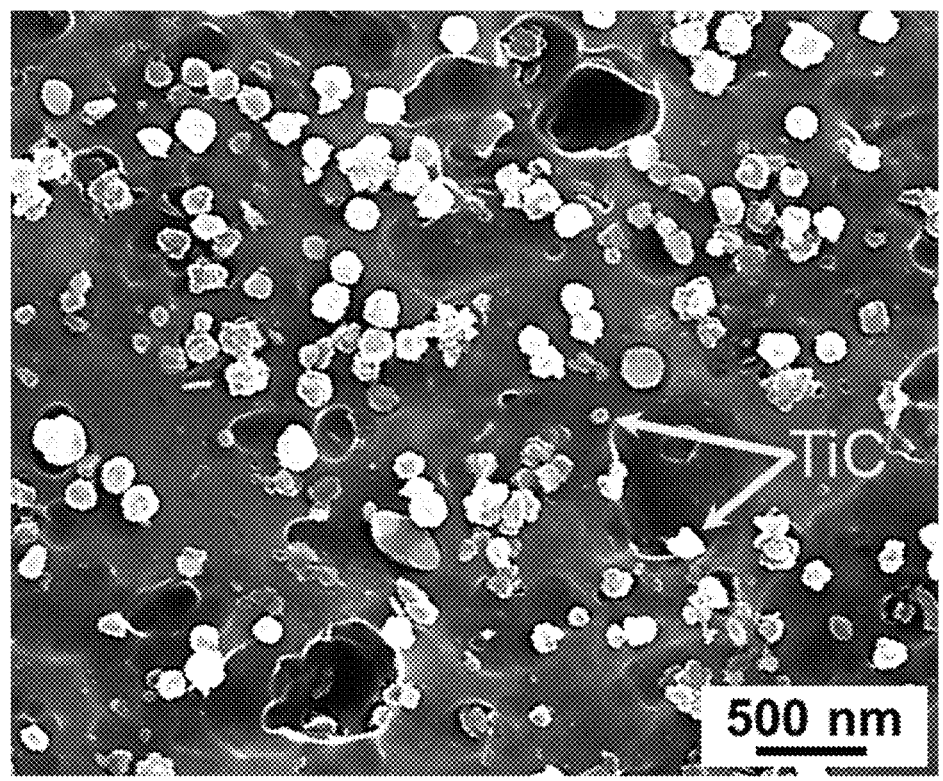
FIG. 4 is an SEM image of the surface of a nanocomposite particle.

After SLM process, the final part was grinded by SiC abrasive grinding paper with the grit numbers of 800 and then polished with polishing cloth kempad of 9, 3, 1 and 0.05 µm. Before the SEM characterization, Keller solution was utilized during the etching experiment to indicate the distribution of TiC nanoparticles. A Helios NANOLAB 600 FIB SEM was utilized for the SEM analysis. As shown in FIG. 4, there is uniform distribution of TiC nanoparticles in the Al6061-5 vol. % TiC nanocomposite. This confirms the Al6061-5 vol. % TiC nanocomposite powders have good processability for additive manufacturing processes.

The metal matrix nanocomposite powders of the invention have several qualities that satisfy requirements for AM process. In particular, the powder particles have a spherical shape, with an average circularity of at least 0.88. There is uniform distribution of ex-situ ceramic nanoparticles. "Ex-situ" refers to the fact that the ceramic particles cannot be obtained by precipitation during atomization or solid state precipitation. The uniformity is characterized by the fact that (1) the ceramic nanoparticles inside the powder instead of just on the powder surface or forming dusters, and (2) the distances between the centers of adjacent ceramic nanoparticles in the metal matrix are mostly less than 500 nm. So there is no large area in the metal matrix free of ceramic nanoparticles. Furthermore, (3) the distances between the edges of the adjacent ceramic nanoparticles are mostly larger than 25 nm, such as for 90% or more of the nanoparticles. This indicates that the ceramic nanoparticles are well separated in the metal matrix. The powder particles have good flowability (with a Hausner Ratio of 1.0-1.11 indicating an "excellent" flow character). There is a dean and smooth powder surface (without any other contamination or deposited material). The impurity level of each element such as O, C, H, N, and S introduced from the process is less than 100 ppm, and more preferably, less than 10 ppm.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawings shall be interpreted as illustrative and not in a limiting sense.

The invention claimed is:

1. A process for manufacturing metal-ceramic composite material powder comprising:
    ball milling a starting metal powder and ceramic nanoparticles to yield a metal-ceramic composite powder comprising ceramic nanoparticles embedded in a metal matrix powder;
    wherein the ball milling is performed using a ceramic milling media and a milling vessel having a ceramic interior surface; and
    wherein one of the following conditions is met:
        the ceramic nanoparticles comprise a titanium compound and the ceramic milling media and milling vessel interior surface also comprise a titanium compound;
        the ceramic nanoparticles comprise a zirconium compound and the ceramic milling media and milling vessel interior surface also comprise a zirconium compound; or
        the ceramic nanoparticles comprise a niobium compound and the ceramic milling media and milling vessel interior surface also comprise a niobium compound.

2. The process of claim 1 wherein the ceramic nanoparticles comprise a titanium compound and the ceramic milling media and milling vessel interior surface also comprise a titanium compound and the ceramic nanoparticles comprise a titanium compound which is different from the titanium compound of the ceramic milling media and milling vessel interior surface.

3. The process of claim 1 wherein the ceramic nanoparticles comprise a zirconium compound and the ceramic milling media and milling vessel interior surface also comprise a zirconium compound and the ceramic nanoparticles comprise a zirconium compound which is different from the zirconium compound of the ceramic milling media and milling vessel interior surface.

4. The process of claim 1 wherein the ceramic nanoparticles comprise a niobium compound and the ceramic milling media and milling vessel interior surface also comprise a niobium compound and the ceramic nanoparticles comprise a niobium compound which is different from the niobium compound of the ceramic milling media and milling vessel interior surface.

5. The process of claim 1 wherein the ceramic milling media are spherical and have a particle size which is between about 50000 and about 500000 times the particle size of the ceramic nanoparticles.

6. The process of claim 1 wherein the ceramic milling media are spherical and have a particle size which is between about 100000 and about 300000 times the particle size of the ceramic nanoparticles.

7. The process of claim 1 wherein the ceramic nanoparticles have a particle size of between about 10 and about 100 nm.

8. The process of claim 7 wherein the ceramic milling media has a particle size of between about 1 and about 10 mm.

9. The process of claim 8, wherein the starting metal powder has a particle size between about 10 and about 100 µm.

10. The process of claim 1 further comprising subjecting the composite powders to plasma spheroidization.

11. The process of claim 1 wherein the ceramic milling media and milling vessel interior surface have a hardness which is the same as or greater than the hardness of the ceramic nanoparticles, and which is greater than a hardness of the metal matrix powder.

12. A process for manufacturing metal-ceramic composite material powder comprising:
    ball milling a starting metal powder and ceramic nanoparticles to yield a metal-ceramic composite powder comprising ceramic nanoparticles embedded in a metal matrix powder;
    wherein the ball milling is performed using a ceramic milling media and a milling vessel having a ceramic interior surface; and
    wherein the starting metal powder is an aluminum alloy and the nanoparticles, milling media, and milling vessel interior surface are TiC.

13. The process of claim 12 wherein the ceramic milling media are spherical and have a particle size which is between about 50000 and about 500000 times the particle size of the ceramic nanoparticles.

14. The process of claim 12 wherein the ceramic milling media are spherical and have a particle size which is between about 100000 and about 300000 times the particle size of the ceramic nanoparticles.

15. The process of claim 12 wherein the ceramic nanoparticles have a particle size of between about 10 and about 100 nm.

16. The process of claim 15 wherein the ceramic milling media has a particle size of between about 1 and about 10 mm.

17. The process of claim 16, wherein the starting metal powder has a particle size between about 10 and about 100 µm.

18. The process of claim 12 further comprising subjecting the composite powders to plasma spheroidization.

19. The process of claim 12 wherein the ceramic milling media and milling vessel interior surface have a hardness which is the same as or greater than the hardness of the ceramic nanoparticles, and which is greater than a hardness of the metal matrix powder.

* * * * *